Oct. 13, 1959   H. M. BROWDER, JR., ET AL   2,908,403
DEVICE FOR REMOVING AND INSTALLING AUTOMOBILE DOORS
Filed April 11, 1956
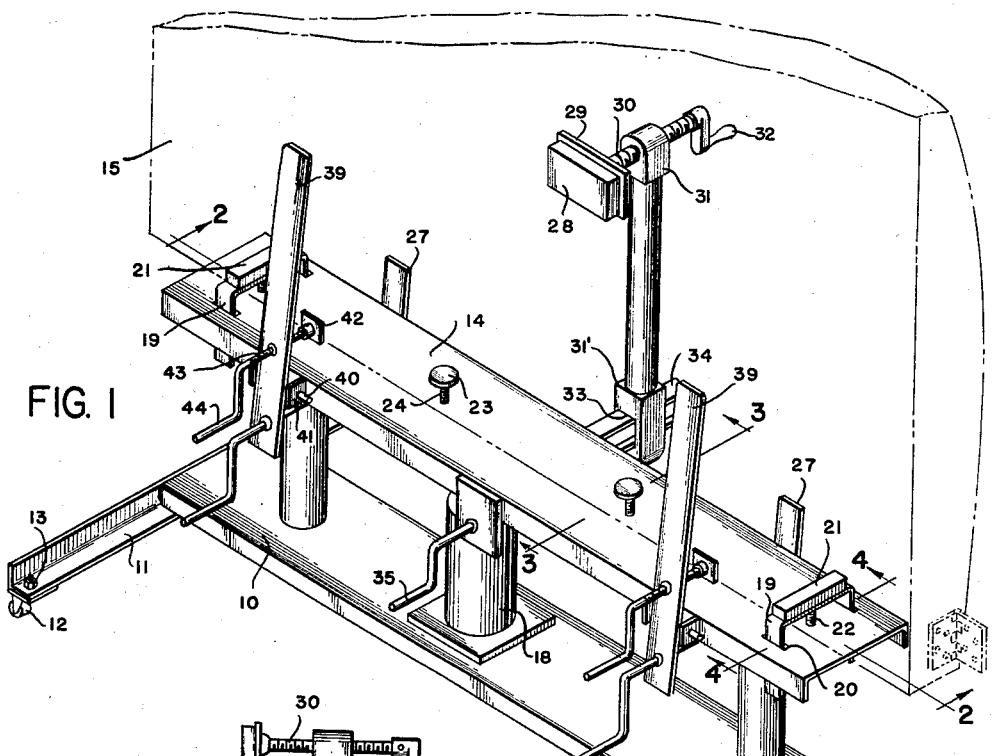
FIG. 1
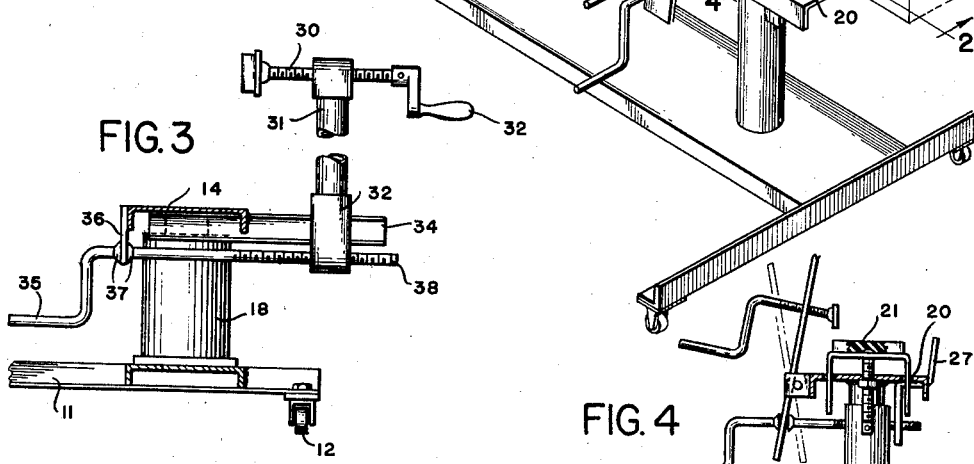
FIG. 3
FIG. 4
FIG. 2
INVENTORS
D. S. BROWDER
H. M. BROWDER, JR
BY A. Yates Dowell
ATTORNEY
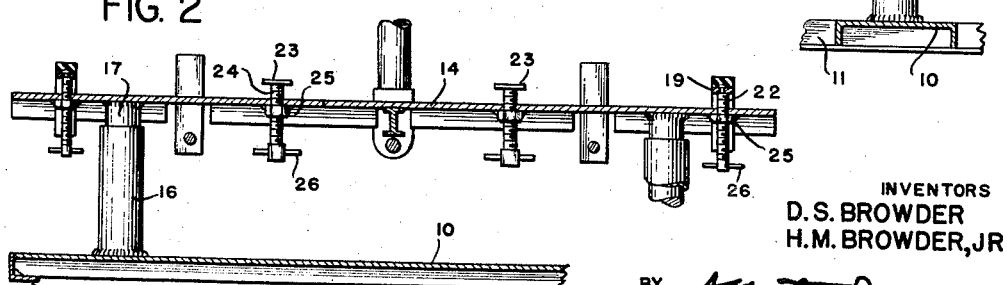

United States Patent Office
2,908,403
Patented Oct. 13, 1959

2,908,403
DEVICE FOR REMOVING AND INSTALLING AUTOMOBILE DOORS

Herbert M. Browder, Jr., and Doniphan S. Browder, Weldon, N.C.

Application April 11, 1956, Serial No. 577,511

3 Claims. (Cl. 214—1)

This invention relates to equipment employed in connection with the performance of certain operations in order to reduce the amount of work as well as to facilitate the completion thereof including equipment involving special tools employed for performing a particular task.

The invention relates more particularly to special tools and equipment employed in the automotive industry for use in servicing and repairing vehicle bodies of various kinds including automobiles and relates specifically to a device for removing and installing automobile doors.

Work upon automobile doors to repair or perform other services thereon, has presented substantial problems it having been desirable at times to remove the door in order to work upon the same and this has been difficult and has required at least two men rendering the cost of repair relatively expensive.

It is an object of the invention to provide a relatively simple and inexpensive device for removing and installing automobile doors, which is easy to manufacture and use thereby resulting in a substantial simplification of the task and saving time and expense.

Another object of the invention is to provide a device for removing and installing automobile or the like doors, which device can be easily moved into position beneath the automobile door and the clamps moved into place to grip the door and permit it to be elevated by means of a conventional jack, whether hydraulic or of other character, as well as a device for holding a door so that it can be removed and later reinstalled both without damage.

Other objects and advantages of the invention will be apparent from the following description taken in conjunction with the accompanying drawing wherein:

Fig. 1 is a perspective illustrating one application of the invention;

Fig. 2, a vertical longitudinal section on the line 2—2 of Fig. 1;

Fig. 3, a vertical transverse section at right angles to that of Fig. 2 and on the line 3—3 of Fig. 1; and Fig. 4, a vertical transverse section on the line 4—4 of Fig. 1.

Briefly stated, the invention comprises a base, and a platform for adjustable attachment to the door of an automobile, the height of said platform being adjustable to accommodate doors of different heights. The base comprises an inverted U-shaped channel member 10 having its end welded or otherwise supported by and fastened to an L-shaped channel member 11 at each end and mounted on rollers 12 located one at each end of said channel member and connected thereto by bolts 13. The channel member 10 is supported so that the channel members are shorter at one side of said member than at the other to provide added stability at the side with the longer portions.

Above the base is mounted a second inverted channel member which forms a platform 14 adapted to be disposed beneath an automobile door 15 for supporting the same. The platform 14 is vertically adjustable relative to the base and is adapted to be maintained in proper relation to the base by means of a pair of adjustable supports, each comprising a sleeve 16 having its lower end fixed to the base and into the upper end of which telescopes a slightly smaller sleeve or body 17 having its upper end welded to the under surface of the platform 14.

The telescoping of the members 16 and 17 allows the platform to be raised from its lowermost position to its uppermost position but at the same time insures proper relations between the base and platform. Raising of the inverted channel member or platform 14 may be accomplished in any desired manner as, for example, by means of a hydraulic or other conventional type of jack 18.

In order to attach the device to the door of an automobile, a series of door engaging devices are provided including spaced inverted U-shaped members having one located adjacent each end of the platform 14, the platform being provided with openings 20 through which the legs of the U-shaped member 19 freely depend. The spaced supports 19 preferably are provided with mar-preventing pads or cushions 21 on which a door is adapted to be received and supported, the supports 19 each being vertically adjustable by means of a screw 22.

The supports 19 are intended for use with a door which is relatively wide. However, with a narrower door such as a rear door having a narrow lower end, a pair of supports 23 may be employed, such supports including threaded shanks 24 which extend through nuts 25 welded or otherwise secured beneath the bottom of the platform 14, the lower end of each screw being provided with an operating handle 26. By rotating the handles, the screws may be adjusted until they firmly engage the door. In like manner, the screws 22 thread through a corresponding nut 25 and are provided with handles 26, each of the upper end of the screws being rotatably connected with one of the supports 19 and being capable of being vertically adjusted like the supports 23.

In order to provide for lateral engagement with the door of an outomobile a pair of brackets 27 are mounted at one side of the platform 14 preferably being welded or otherwise secured in fixed position to prevent the edge of the door from slipping from the platform, and another door engaging member is provided to engage the center of the door and includes a pad 28 of relatively soft cushioning material so that it will not mar the surface of the door, the cushion 28 being fixed to a support 29 attached to a screw 30 threaded through the upper end of a support 31, such screw being adapted to be rotated by a handle 32 for advancing and retracting the pad 28. At its lower end the support 31 is provided with a base 31' having a transverse slot 33 in which is received a transverse bar 34 on which the upright is horizontally slidable, such sliding action being obtained by means of a crank 35 rotatable in a bracket 36 attached to the platform 14, and having opposed fixed collars 37 permitting rotation but not endwise movement of an externally threaded shaft 38, the threads of which engage with corresponding threads of the base 32. A three-point engagement of one face of a door is thus provided on one side of the platform.

In order to provide for engagement of the door at the opposite side of the platform, a pair of spaced pivoted arms 39 are welded each to a pivot pin 40 mounted in ears 41 welded to the platform 14. The arms 39 are provided with door engaging members 42 swivelled on the ends of screws 43 having operating cranks 44 on their ends. When an automobile door is to be removed the device is moved into position so that the platform 14 is beneath the door and the brackets engage the face of the door. Thereafter, the pad 28 is moved into contact with the door by operating the cranks 32 and 35. The door should be supported on the pads 21 or members 23 and engaged on one face by both brackets 27, and by the pad 28. The door may then be engaged by the arms 39 and the heads 42, thus securely gripping the door so that it can be removed and replaced in the same manner.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A device for removing and installing automobile doors comprising a base, spaced laterally disposed supports mounting said base, said laterally disposed supports being located a greater amount on one side of said base than on the other, a platform above said base, spaced telescopic connecting members fixed to said base and to said platform and maintaining them in predetermined relation one above the other but permitting raising and lowering of said platform on said base, spaced vertically adjustable supports carried by said platform for engagement with the bottom of an automobile door, a pair of fixed door engaging members carried at one side of said platform, an adjustable bracket mounted on said platform in a manner to engage the face of an automobile door, means for adjusting said bracket transversely of said platform and for independently adjusting a door engaging portion of said bracket, spaced upright arms pivoted on said platform for engagement with the opposite face of an automobile door, door engaging members carried by said upright arms, and means for adjustably pivoting said arms and for adjusting the door engaging members carried by said upright arms so that the door can be engaged by said arms and said door engaging means in a plurality of locations.

2. A device for removing and installing automobile doors comprising a base, spaced laterally disposed supports mounting said base, said laterally disposed supports being located a greater amount on one side of said base than on the other, a platform above said base, connecting members fixed to said base and to said platform and maintaining them in predetermined relation one above the other permitting raising and lowering of said platform, spaced vertically adjustable supports carried by said platform for engagement with the bottom of an automobile door, door engaging members carried at one side of said platform including an adjustable bracket mounted on said platform in a manner to engage the face of an automobile door, spaced upright arms pivoted on said platform for engagement with the opposite face of an automobile door, door engaging members carried by said upright arms, and means for adjustably pivoting said arms so that the door can be engaged in a plurality of locations on its opposite sides.

3. A device for removing and installing automobile doors comprising a base, a platform above said base, connecting members fixed to said base and to said platform and maintaining them in predetermined relation one above the other permitting raising and lowering of said platform, spaced vertically adjustable supports carried by said platform for engagement with the bottom of an automobile door, door engaging members carried at one side of said platform including an adjustable bracket mounted on said platform in a manner to engage one side of an automobile door, spaced upright arms pivoted on said platform for engagement with the opposite side of an automobile door, door engaging members carried by said upright arms, and means for adjustably pivoting said arms so that the door can be engaged in a plurality of locations on its opposite side.

References Cited in the file of this patent

UNITED STATES PATENTS

| | | |
|---|---|---|
| 2,418,586 | Jenkins | Apr. 8, 1947 |
| 2,503,388 | Hedlund | Apr. 11, 1950 |
| 2,781,920 | Burington | Feb. 19, 1957 |